(12) United States Patent
Izumi et al.

(10) Patent No.: US 10,246,085 B2
(45) Date of Patent: *Apr. 2, 2019

(54) VEHICLE BEHAVIOR CONTROL DEVICE TO CONTROL A VEHICLE BASED ON STEERING CHARACTERISTICS

(71) Applicant: MAZDA MOTOR CORPORATION, Hiroshima (JP)

(72) Inventors: Tomoji Izumi, Hatsukaichi (JP); Yasunori Takahara, Hiroshima (JP); Daisuke Umetsu, Hiroshima (JP); Osamu Sunahara, Hiroshima (JP); Masaki Chiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/710,459

(22) Filed: Sep. 20, 2017

(65) Prior Publication Data

US 2018/0079407 A1 Mar. 22, 2018

(30) Foreign Application Priority Data

Sep. 21, 2016 (JP) ................................. 2016-183860

(51) Int. Cl.
*B60W 30/02* (2012.01)
*B60W 30/045* (2012.01)
(Continued)

(52) U.S. Cl.
CPC ............. *B60W 30/025* (2013.01); *B60K 1/00* (2013.01); *B60W 30/045* (2013.01);
(Continued)

(58) Field of Classification Search
CPC ..... B60W 30/025; B60W 30/045; B60K 1/00; B62D 6/003; B62D 15/0225; B62D 15/022

See application file for complete search history.

(56) References Cited

U.S. PATENT DOCUMENTS

| | | | | |
|---|---|---|---|---|
| 7,913,803 B2 * | 3/2011 | Hidaka | ................ | B62D 15/025 180/443 |
| 8,825,297 B2 * | 9/2014 | Tanimoto | ............. | B62D 15/025 180/412 |
| 2005/0222727 A1 * | 10/2005 | Hille | ..................... | B60W 30/04 701/38 |
| 2014/0136070 A1 * | 5/2014 | Yasui | .................. | B60T 8/17555 701/70 |
| 2015/0144418 A1 * | 5/2015 | Ohno | ................... | B62D 5/0466 180/446 |

FOREIGN PATENT DOCUMENTS

| | | |
|---|---|---|
| JP | 2005-193752 A | 7/2005 |
| JP | 2006-131141 A | 5/2006 |

(Continued)

OTHER PUBLICATIONS

An Office Action; "Notice of Reasons for Rejection," mailed by the Japanese Patent Office dated Jul. 31, 2017, which corresponds to Japanese Patent Application No. 2016-183860; with English language Concise Explanation.

*Primary Examiner* — Hussein Elchanti
*Assistant Examiner* — Majdi Alsomiri
(74) *Attorney, Agent, or Firm* — Studebaker & Brackett PC

(57) ABSTRACT

The vehicle behavior control device comprises: a steer-by-wire type steering apparatus (6) having a steering wheel-side mechanism and a road wheel-side mechanism which are mechanically separated from each other; and a controller (8) performs a driving force reduction control of reducing a driving force for a vehicle (1) when a steering speed in the (Continued)

steering apparatus (6) becomes equal to or greater than a given threshold. The steering apparatus (6) comprises a first steering angle sensor (14) provided in the steering wheel-side mechanism and a second steering angle sensor (19) provided in the road wheel-side mechanism. The controller (8) performs the driving force reduction control based on the steering speed in accordance with a sum of an output of the first steering angle sensor (14) and an output of the second steering angle sensor (19).

4 Claims, 9 Drawing Sheets

(51) Int. Cl.
  *B62D 6/00* (2006.01)
  *B62D 15/02* (2006.01)
  *B60K 1/00* (2006.01)

(52) U.S. Cl.
  CPC .......... *B62D 6/003* (2013.01); *B62D 15/022* (2013.01); *B62D 15/0225* (2013.01)

(56) References Cited

FOREIGN PATENT DOCUMENTS

| | | |
|---|---|---|
| JP | 2006-321471 A | 11/2006 |
| JP | 2007-203801 A | 8/2007 |
| JP | 2009-248664 A | 10/2009 |
| JP | 2010-137745 A | 6/2010 |
| JP | 2011-225144 A | 11/2011 |
| JP | 6193885 B2 | 5/2013 |
| JP | 2013-184622 A | 9/2013 |
| JP | 2014-013006 A | 1/2014 |
| JP | 2014-221592 A | 11/2014 |
| JP | 2015-231840 A | 12/2015 |

\* cited by examiner

VEHICLE BEHAVIOR CONTROL DEVICE TO CONTROL A VEHICLE BASED ON STEERING CHARACTERISTICS

BACKGROUND OF THE INVENTION

Field of the Invention

The present invention relates to a vehicle behavior control device, and more particularly to a vehicle behavior control device for controlling a behavior of a vehicle having steerable front road wheels.

Description of Related Art

Heretofore, there has been known a control device capable of, in a situation where a behavior of a vehicle becomes unstable due to road wheel slip or the like, controlling the vehicle behavior to enable a safe traveling (e.g., an antiskid brake device). Specifically, there has been known a control device operable to detect the occurrence of vehicle understeer or oversteer behavior during vehicle cornering or the like, and apply an appropriate degree of deceleration to one or more road wheels so as to suppress such a behavior.

There has also been known a vehicle motion control device operable to automatically perform acceleration or deceleration associated with a steering operation which is started from a usual driving region, to thereby reduce skid in a marginal driving region, differently from the above control for improving safety in a traveling condition causing the vehicle behavior to become unstable (JP 5193885 B).

BRIEF SUMMARY OF THE INVENTION

Technical Problem

The vehicle motion control device described in the Patent Document 1 is configured to detect a steering angle along with a steering operation by a driver, as a parameter best reflecting an intention of the driver, and perform the acceleration/deceleration control using this steering angle. With a view to reflecting the driver's intention, the steering angle is detected by a driver-induced steering angle sensor provided at a position very close to the steering wheel.

As above, the conventional vehicle motion control device is designed with a focus on reflecting an intention of a driver to a behavior of a vehicle, and configured to detect the steering angle and perform the acceleration/deceleration control. However, there still remains a need for improvement in terms of stability of vehicle attitude and riding comfort.

The present invention has been made to solve the above conventional problem, and an object thereof is to provide a vehicle behavior control device capable of controlling a behavior of a vehicle in such a manner as to not only reflect an intention of a driver to the vehicle behavior but also further improve stability of vehicle attitude and riding comfort.

Solution to Problem

In order to achieve the above object, the present invention provides a vehicle behavior control device configured to control a behavior of a vehicle having steerable front road wheels, including: a steering apparatus configured to transmit rotation of a steering wheel toward the front road wheels, the steering apparatus having: a steering wheel-side mechanism which is coupled to the steering wheel, and configured to transmit rotation of the steering wheel; and a road wheel-side mechanism which is coupled to the steering wheel-side mechanism via a low rigidity portion having a relatively low torsional rigidity or is mechanically separated from the steering wheel-side mechanism, and configured to turn the front road wheels according to the rotation of the steering wheel; and a driving force reduction part configured to, when a steering speed in the steering apparatus becomes equal to or greater than a given threshold greater than 0, perform a driving force reduction control in order to reduce a vehicle driving force according to the steering speed, wherein the steering apparatus comprises: a first steering angle sensor provided in the steering wheel-side mechanism and configured to detect a steering angle corresponding to rotation of the steering wheel; and a second steering angle sensor provided in the road wheel-side mechanism and configured to detect a steering angle corresponding to turning of the front road wheels, and wherein the driving force reduction part is configured to perform the driving force reduction control based on the steering speed in accordance with a sum of an output of the first steering angle sensor and an output of the second steering angle sensor.

In the vehicle behavior control device of the present invention, the driving force reduction part is operable to derive the steering speed by taking into account both of the output of the first steering angle sensor provided in the steering wheel-side mechanism and the output of the second steering angle sensor provided in the road wheel-side mechanism, to perform the driving force reduction control for reducing the vehicle driving force.

Based on this configuration, in a situation where a driver purposefully performs a steering operation, the driving force reduction part operates to derive the steering speed mainly using the output of the first steering angle sensor provided in the steering wheel-side mechanism, to reduce the vehicle driving force according to the derived steering speed. Thus, when a driver purposefully performs a steering operation (e.g., cornering or lane change), the vehicle driving force can be quickly reduced, based on a steering speed according to a steering angle from the first steering angle sensor capable of immediately detecting such a steering operation by a driver. This makes it possible to control a behavior of the vehicle with good responsivity with respect to a steering operation by a driver to accurately realize the vehicle behavior as intended by the driver. More specifically, it becomes possible to adequately realize induction of a diagonal attitude of the vehicle.

On the other hand, in a situation where the front road wheels are turned by a disturbance force when a driver does not purposefully perform a steering operation, the driving force reduction part operates to derive a steering speed mainly using the output of the second steering angle sensor provided in the road wheel-side mechanism, to reduce the vehicle driving force according to the derived steering speed. Thus, when the front road wheels are forcibly turned under the influence of a disturbance force arising from unevenness of a road surface, crosswind or the like, the vehicle driving force can be quickly reduced, based on a steering speed according to a steering angle from the second steering angle sensor capable of immediately detecting such turning of the front road wheels. This makes it possible to generate a torque acting to return the steering angle of the turned front road wheels to a neutral angle enabling straight-ahead traveling (self-aligning torque), at a timing before the disturbance force is transmitted to the driver via the steering wheel, to improve stability of straight-ahead traveling performance of the vehicle.

Further, in the present invention, in a situation where the driver feels, via the steering wheel, tuning of the front road wheels caused by a disturbance force, and then attempts to perform a corrective steering operation for maintaining a course of the vehicle, it becomes possible to, before the driver starts the corrective steering operation, reduce the driving force to increase a vertical load on the front road wheels, so that a lateral force to be generated in the front road wheels when the driver starts the corrective steering operation can be further increased. Thus, it becomes possible to enhance responsivity of the vehicle behavior with respect to the corrective steering operation. This makes it possible to suppress an unnecessary corrective steering operation to improve stability of vehicle attitude and riding comfort.

Preferably, in the vehicle behavior control device of the present invention, the driving force reduction part is operable, during calculation of the sum of the output of the first steering angle sensor and the output of the second steering angle sensor, to perform weighted addition of the outputs, while changing a weighting factor for the weighted addition, based on a frequency of phase-change of the steering speed in the steering apparatus.

According to this feature, the weighting factor for use in the weighted addition of the output of the first steering angle sensor and the output of the second steering angle sensor is changed based on the frequency of phase-change of the steering speed, so that it is possible to reduce the driving force according to a steering speed derived while placing priority on a steering operation by a driver or placing priority on turning of the front road wheels by a disturbance force or the like.

Preferably, in the vehicle behavior control device of the present invention, when the output of the first steering angle sensor indicates that operation of rotating the steering wheel is performed, and the output of the second steering angle sensor indicates that the front road wheels are turned in a direction opposite to a direction of the rotation of the steering wheel, the driving force reduction part is configured to perform the driving force reduction control based on the steering speed in accordance with only the output of the first steering angle sensor, without using the sum of the output of the first steering angle sensor and the output of the second steering angle sensor.

According to this feature, for example, in a situation where, when a driver performs the steering operation during cornering or lane change, the front road wheels are turned in a direction opposite to a direction of the steering operation by the driver due to a disturbance force, i.e., when the direction of turning of the front road wheels caused by the disturbance force has an opposite phase with respect to the direction of the steering operation by the driver, the driving force reduction part operates to derive the steering speed, according to only the output of the first steering angle sensor, without adding the output of the second steering angle sensor arising from the turning of the front road wheels due to the disturbance force, to the output of the first steering angle sensor, i.e., without using the sum of the output of the first steering angle sensor and the output of the second steering angle sensor. During the driving force reduction control being performed according to the steering operation by the driver, if the opposite-phase output of the second steering angle sensor caused by the disturbance force is added to derive the steering speed, the steering speed is lowered, and thus a driving force reduction amount is reduced. The above feature makes it possible to suppress this situation. Thus, it becomes possible to adequately ensure the vehicle behavior control according to the steering operation by the driver. For example, even when the front road wheels are turned due to rough road during steady turning of the vehicle, it becomes possible to stable perform steering retention of the steering shaft.

Preferably, in the vehicle behavior control device of the present invention, the driving force reduction part is operable to reduce the driving force more largely as the steering speed becomes larger, to an extent that a deceleration caused in the vehicle by the reduction in the driving force becomes equal to or less than 0.05 G.

According to this feature, it is possible to perform the driving force reduction control to generate a small deceleration enough to keep a driver from feeling intervention of the control. This makes it possible to improve the stability of vehicle attitude and the riding comfort without causing strong feeling of intervention of the control.

The vehicle behavior control device of the present invention can control the vehicle behavior in such a manner as to not only reflect an intention of a driver to the vehicle behavior but also further improve the stability of vehicle attitude and the riding comfort.

DETAILED DESCRIPTION OF THE INVENTION

With reference to the accompanying drawings, a vehicle behavior control device according to one embodiment of the present invention will now be described.

<Device Configuration>

Figure 1:
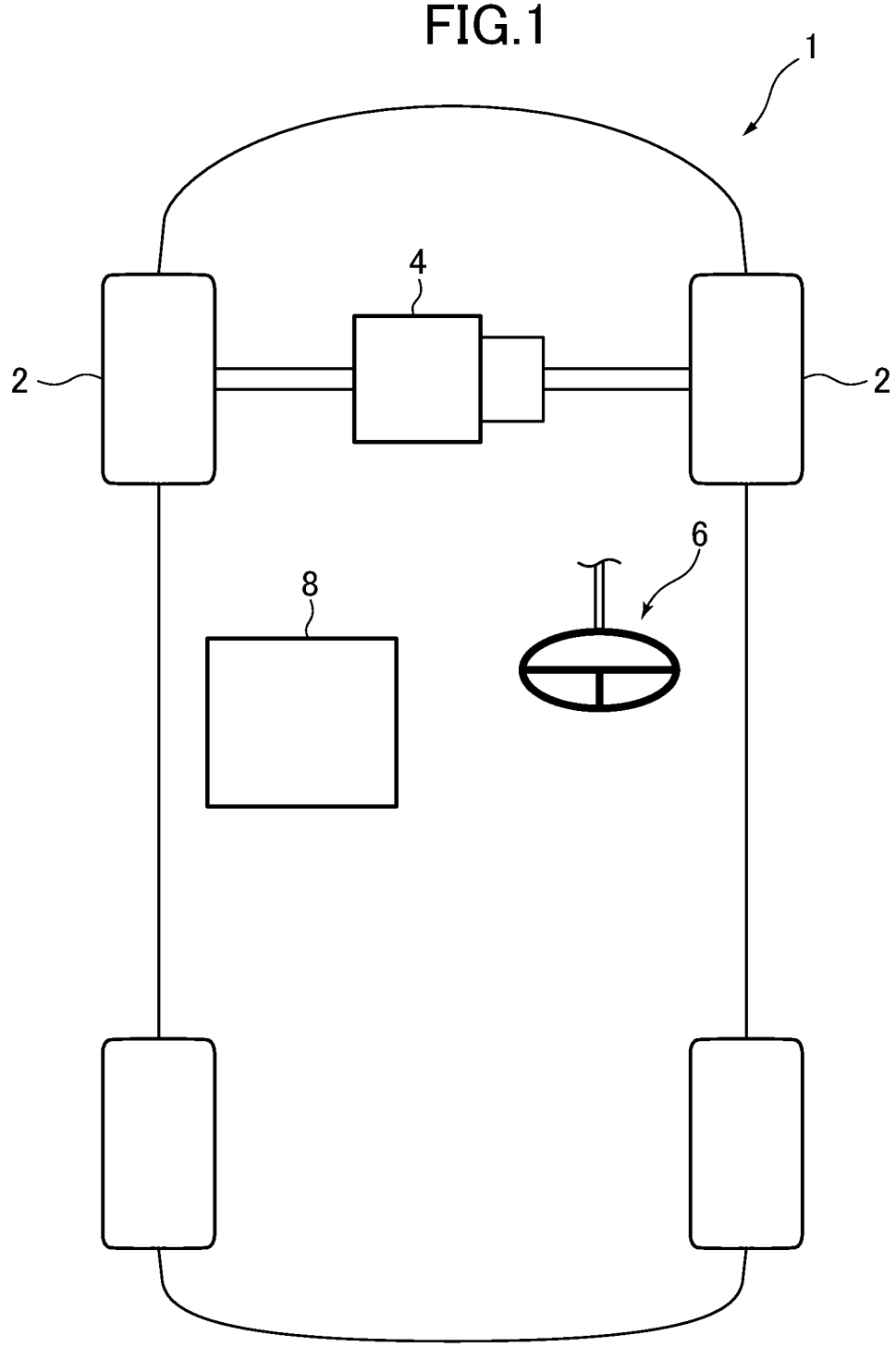
FIG. 1 is a schematic configuration diagram of a vehicle employing a vehicle behavior control device according to one embodiment of the present invention.
Figure 2:
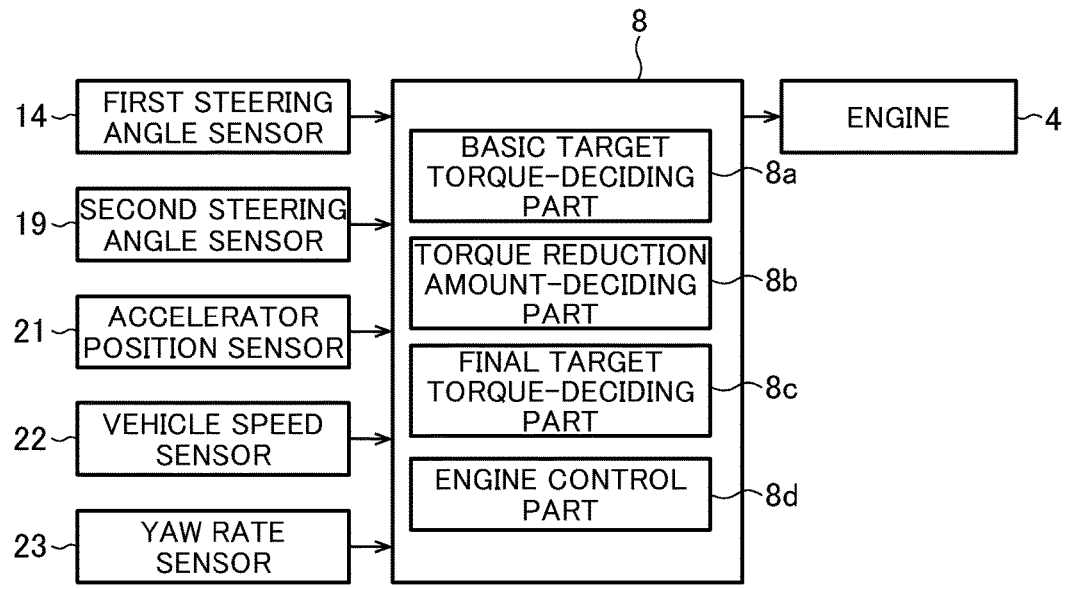
FIG. 2 is a block diagram depicting an electrical configuration of the vehicle behavior control device according to this embodiment.

First of all, with reference to FIGS. 1 to 3, a configuration of a vehicle behavior control device according to one embodiment of the present invention will be described. FIG. 1 is a schematic configuration diagram of a vehicle employing a vehicle behavior control device according to one embodiment of the present invention. FIG. 2 is a block diagram depicting an electrical configuration of the vehicle behavior control device according to this embodiment, and FIG. 3 is a schematic configuration diagram of a steering apparatus comprised in the vehicle employing the vehicle behavior control device according to this embodiment.

As depicted in FIG. 1, a vehicle body of a vehicle 1 has a front portion on which an engine 4 for driving drive road wheels (in the vehicle depicted in FIG. 1, right and left front road wheels 2) is mounted. This engine 4 is an internal combustion engine such as a gasoline engine or a diesel engine. The vehicle 1 is equipped with a steering apparatus 6 for transmitting rotation of an aftermentioned steering wheel 11 (see FIG. 3) toward the front road wheels 2. The vehicle 1 is also equipped with a controller 8 for controlling at least the engine 4 and the steering apparatus 6. This controller 8 comprises a non-depicted power-train control module (PCM).

Figure 3:
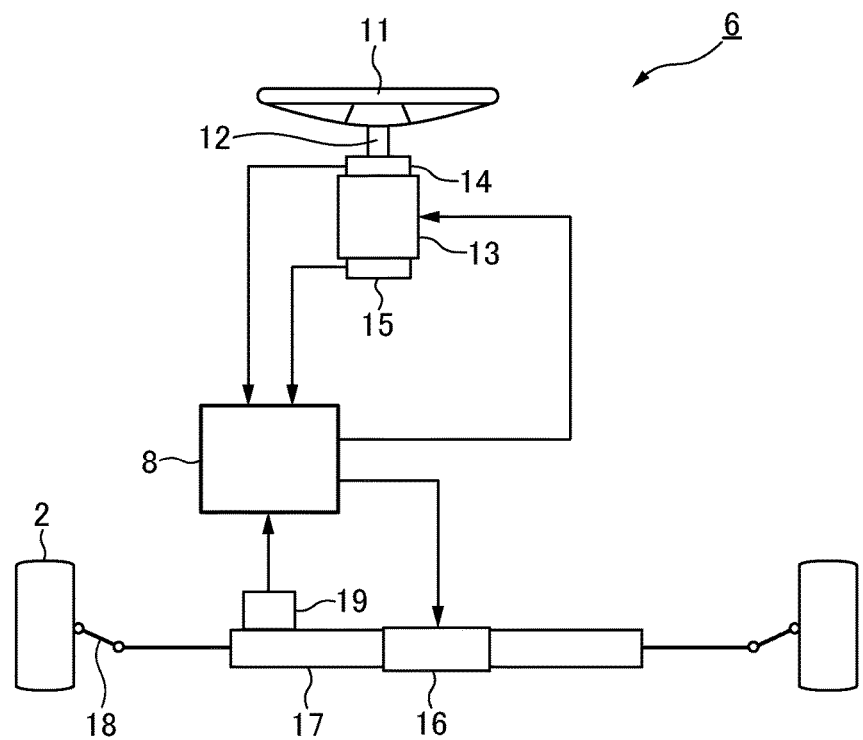
FIG. 3 is a schematic configuration diagram of a steering apparatus comprised in the vehicle employing the vehicle behavior control device according to this embodiment.

As depicted in FIG. 3, the steering apparatus 6 is configured as a steer-by-wire system in which a mechanism for transmitting rotation of the aftermentioned steering wheel 11 (a steering wheel-side mechanism) and a mechanism for turning the front road wheels 2 according to the rotation of the aftermentioned steering wheel 11 (road wheel-side mechanism) are mechanically separated from each other.

Specifically, as the steering wheel-side mechanism, the steering apparatus 6 comprises: a steering wheel 11 to be operated by a driver; a steering shaft 12 rotatable together with the steering wheel 11; an electric motor 13 provided on the steering shaft 12 and operable to generate a torque (typically, reaction torque) and add it to the steering shaft 12; a first steering angle sensor 14 for detecting a rotational angle (steering angle) of the steering shaft 12; and a torque sensor 15 for detecting a steering torque given by the driver via the steering wheel 11. Further, as the road wheel-side mechanism mechanically separated from the steering wheel-side mechanism, the steering apparatus 6 comprises: an electromagnetic steering motor 16 for generating a torque for turning the front road wheels 2; a rack shaft 17 movable by the torque from the electromagnetic steering motor 16; a pair of tie rods 18 for turning the respective front road wheels 2 according to the movement of the rack shaft 17; and a second steering angle sensor 19 for detecting a turning angle (steering angle) of the front road wheels 2.

The controller 8 is configured to receive inputs of various detection signals from the first steering angle sensor 14, the torque sensor 15 and the second steering angle sensor 19 of the steering apparatus 6 and others, and control the electric motor 13 and the electromagnetic steering motor 16 of the steering apparatus 6. Basically, the controller 8 is operable, based on the steering angle detected by the first steering angle sensor 14, to control the electromagnetic steering motor 16 to cause the front road wheels 2 to be turned according to rotation of the steering wheel 11. In this case, the controller 8 is operable to control the electromagnetic steering motor 16, while additionally taking into account a vehicle speed, a yaw rate or the like. Further, in order to enable the electric motor 13 to give, to the steering wheel 11, a torque for informing a driver about a road surface state (road feel), the controller 8 is operable, based on the steering torque detected by the torque sensor 15 and others, to control the torque from the electric motor 13.

With reference to FIG. 2, the controller 8 will be described in more detail. FIG. 2 primarily depicts control of the engine 4 to be executed by the controller 8.

As depicted in FIG. 2, the controller 8 is operable, based on input signals from the steering apparatus 6, and input signals from an accelerator position sensor 21, a vehicle speed sensor 22, a yaw rate sensor 23 and others, to generate and output control signals to perform controls with respect to various components (e.g., a throttle valve, a turbocharger, a variable valve mechanism, an ignition unit, a fuel injection valve, and an EGR unit) of the engine 4.

In this embodiment, the controller 8 is configured to, when a steering speed in the steering apparatus 6 becomes equal to or greater than a given threshold greater than 0, perform a driving force reduction control of reducing a vehicle driving force according to the steering speed. This driving force reduction control is realized by a basic target torque-deciding part 8a, a torque reduction amount-deciding part 8b, a final target torque-deciding part 8c and an engine control part 8d each comprised in the controller 8. Specifically, the basic target torque-deciding part 8a is operable to decide a basic target torque, based on a driving state of the vehicle 1 including an accelerator pedal operation, and the torque reduction amount-deciding part 8b is operable to decide a torque reduction amount for adding a deceleration to the vehicle 1, based on a steering speed in the steering apparatus. The final target torque-deciding part 8c is operable to decide a final target torque, based on the basic target torque and the torque reduction amount, and the engine control part 8d is operable to control the engine 4 to cause the engine 4 to output the final target torque.

These components of the controller 8 are functionally realized by a computer which comprises: a CPU; various programs (including a basic control program such as an OS, and an application program capable of being activated on the OS to realize a specific function) to be interpreted and executed by the CPU; and an internal memory such as ROM or RAM storing therein the programs and a variety of data.

The controller 8 is equivalent to a part of "vehicle behavior control device" set forth in the appended claims, and, more specifically, functions as "driving force reduction part" set forth in the appended claims, although details thereof will be described later.

<Contents of Control>

Next, with reference to FIGS. 4 to 6, an engine control processing routine to be executed by the vehicle behavior control device according to this embodiment will be described.

Figure 4:
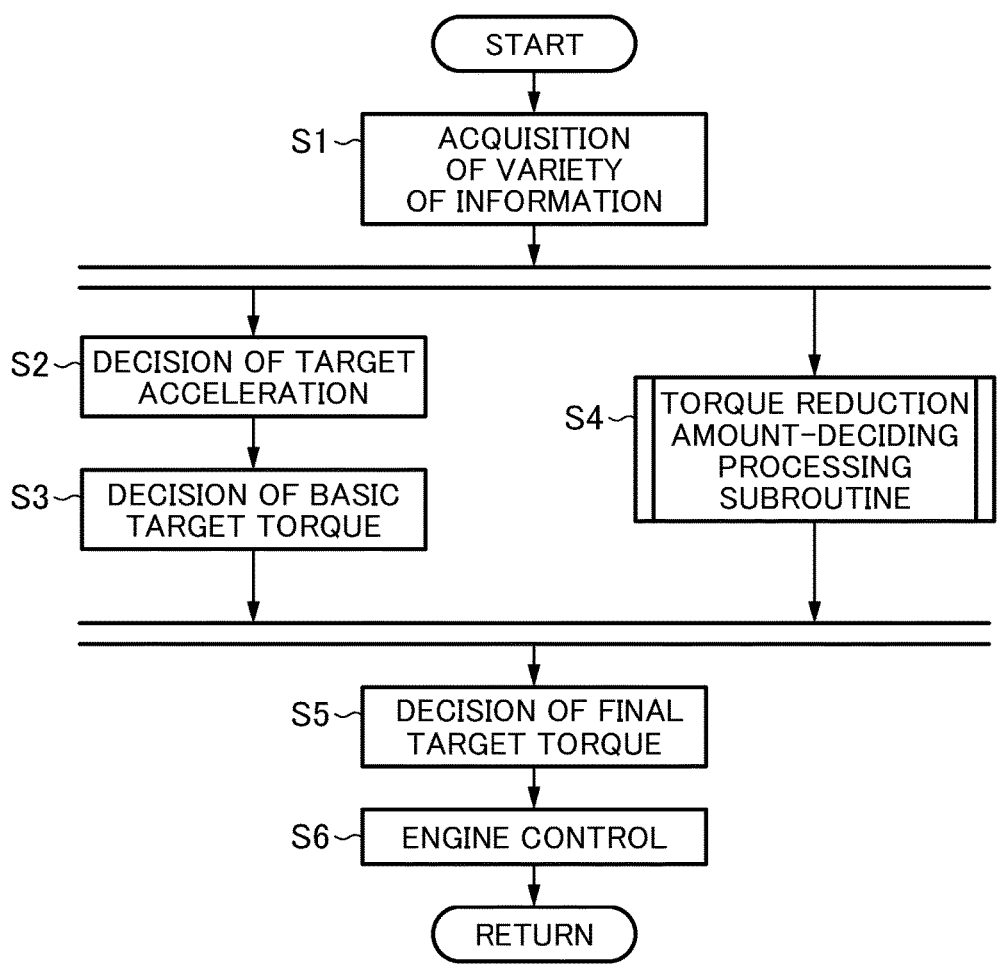
FIG. 4 is a flowchart of an engine control processing routine to be executed by the vehicle behavior control device according to this embodiment, so as to control an engine.
Figure 5:
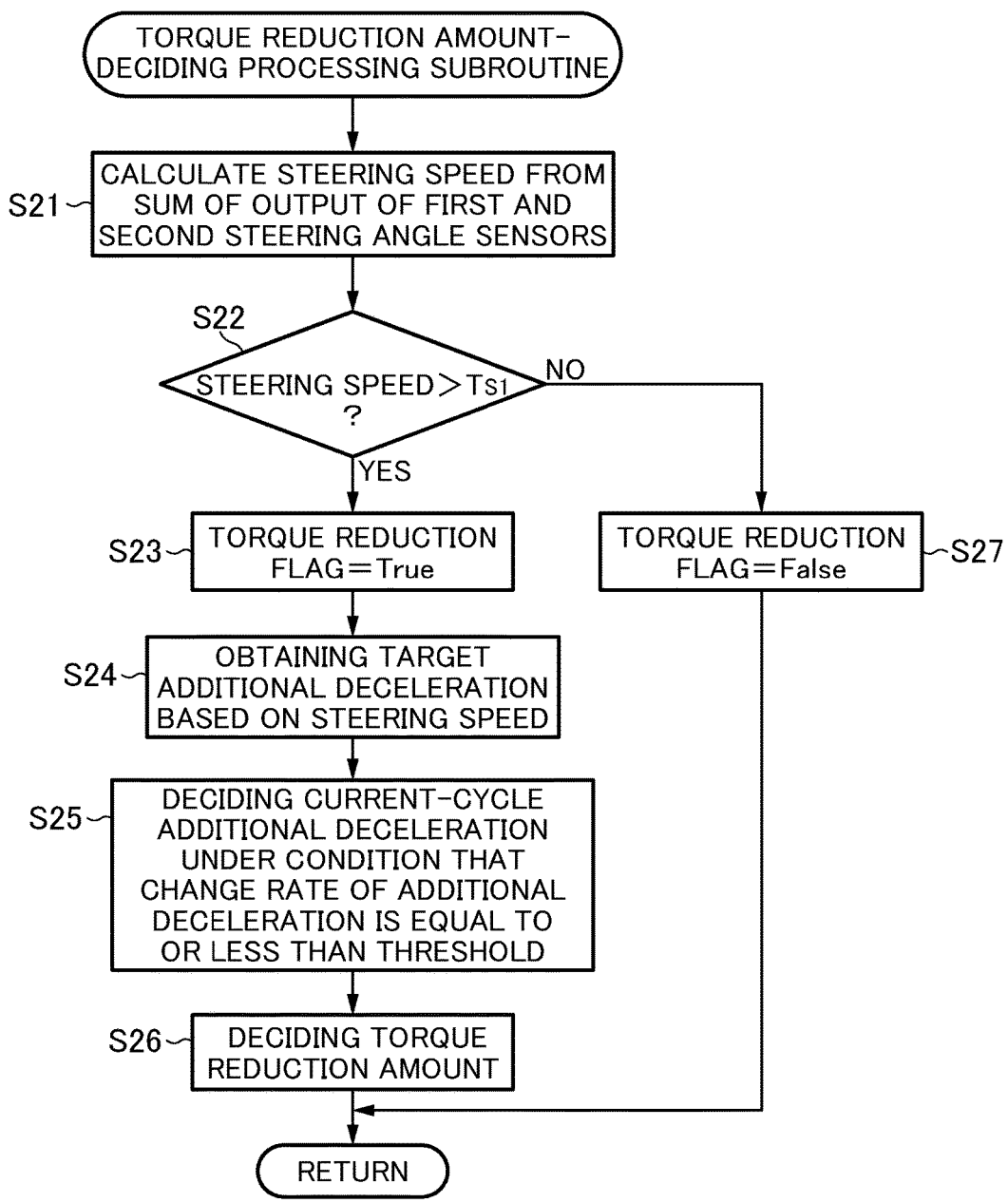
FIG. 5 is a flowchart of a torque reduction amount-deciding processing subroutine to be executed by the vehicle behavior control device according to this embodiment, so as to decide a torque reduction amount.

FIG. 4 is a flowchart of an engine control processing routine to be executed by the vehicle behavior control device according to this embodiment, so as to control the engine 4, and FIG. 5 is a flowchart of a torque reduction amount-deciding processing subroutine to be executed by the vehicle behavior control device according to this embodiment, so as to decide a torque reduction amount. FIG. 6 is a map depicting a relationship between steering speed, and target additional deceleration to be decided by the vehicle behavior control device according to this embodiment.

The engine control processing routine in FIG. 4 is activated when an ignition switch of the vehicle 1 is turned on to apply electric power to the vehicle behavior control device, and repeatedly executed with a given cycle period.

As depicted in FIG. 4, upon start of the engine control processing routine, in step S1, the controller 8 operates to acquire a variety of information about a driving state of the vehicle 1. Specifically, the controller 8 operates to acquire, as the information about the driving state, detection signals output from various sensors, including respective steering angles detected by the first and second steering angle sensors 14, 19, an accelerator position detected by the accelerator position sensor 21, a vehicle speed detected by the vehicle speed sensor 22, and a speed stage currently set in an automatic transmission of the vehicle 1.

Subsequently, in step S2, the controller 8 (basic target torque-deciding part 8a) operates to set a target acceleration based on the driving state of the vehicle 1 acquired in the step S1, including an accelerator pedal operation state. Specifically, the controller 8 operates to select, from among a plurality of acceleration characteristic maps each defining a relationship between acceleration and accelerator position, with respect to various vehicle speeds and various speed stages (the maps are preliminarily created and stored in a memory or the like), one acceleration characteristic map corresponding to a current vehicle speed and a current speed stage, and decide, as a target acceleration, an acceleration corresponding to a current accelerator position, with reference to the selected acceleration characteristic map.

Subsequently, in step S3, the controller 8 operates to decide a basic target torque of the engine 4 for realizing the target acceleration decided in the step S2. In this processing, the controller 8 operates to decide the basic target torque within a torque range outputtable by the engine 4, based on current vehicle speed, speed stage, road grade, road surface mu ($\mu$), etc.

In parallel with the processings in the steps S2 and S3, in step S4, the controller 8 (torque reduction amount-deciding part 8b) operates to execute a torque reduction amount-deciding processing subroutine for deciding a torque reduction amount for adding a deceleration to the vehicle 1 according to steering based on the steering apparatus 6. This torque reduction amount-deciding processing subroutine will be described with reference to FIG. 5.

As depicted in FIG. 5, upon start of the torque reduction amount-deciding processing subroutine, in step S21, the controller 8 operates to derive, as the steering speed for use in deciding a torque reduction amount, a steering speed according to a sum of an output of the first steering angle sensor 14 provided in the steering wheel-side mechanism, and an output of the second steering angle sensor 19 provided in the road wheel-side mechanism (this steering speed will hereinafter be also referred to as "control steering speed"). This makes it possible to decide the torque reduction amount, using a steering speed derived by taking into account both of a steering operation purposefully performed by a driver, and turning of the front road wheels 2 forcibly caused under the influence of a disturbance force arising from unevenness of a road surface, crosswind or the like.

In one example, during calculation of the sum of the output of the first steering angle sensor 14 and the output of the second steering angle sensor 19, the controller 8 operates to perform weighted addition of these outputs. In this example, the controller 8 operates to change a weighting factor for the weighted addition, based on a frequency of phase-change of the steering speed. Typically, when the frequency of phase-change of the steering speed is relatively small, the controller 8 operates to determine that it is highly likely to indicate a steering operation purposefully performed by a driver, and derive the steering speed by setting a weighting factor for the output of the first steering angle sensor 14 to be greater than a weighting factor for the output of the second steering angle sensor 19. This makes it possible to derive the steering speed while placing priority on a steering operation by a driver. On the other hand, when the frequency of phase-change of the steering speed is relatively large, the controller 8 operates to determine that it is highly likely to indicate turning of the front road wheels 2 forcibly caused by a disturbance force, and derive the steering speed by setting the weighting factor for the output of the second steering angle sensor 19 to be greater than the weighting factor for the output of the first steering angle sensor 19. This makes it possible to derive the steering speed while placing priority on turning of the front road wheels 2 by a disturbance force or the like.

The steering speed from which the frequency is measured may be derived from a steering angle corresponding to either one of the outputs of the first and second steering sensors 14, 19. For example, the steering speed may be derived from a steering angle corresponding to temporally-earlier one of the outputs of the first and second steering sensors 14, 19, and used to measure the frequency.

In another example, in a situation where, when a driver performs a steering operation during cornering or lane change, the front road wheels 2 are turned in a direction opposite to a direction of the steering operation by the driver due to a disturbance force, i.e., when the direction of turning of the front road wheels 2 caused by the disturbance force has an opposite phase with respect to the direction of the steering operation by the driver, the controller 8 operates to derive the steering speed, according to only the output of the first steering angle sensor 14, without adding the output of the second steering angle sensor 19 arising from the turning of the front road wheels 2 due to the disturbance force, to the output of the first steering angle sensor 14, i.e., without using the sum of the output of the first steering angle sensor 14 and the output of the second steering angle sensor 19. During the control of a behavior of the vehicle 1 based on a torque reduction amount according to a steering operation by a driver, if the opposite-phase output of the second steering angle sensor 19 caused by the disturbance force is added to derive the steering speed, the steering speed is lowered, and thus the torque reduction amount is reduced, thereby leading to deterioration in the above effects of the vehicle behavior control according to a steering operation by a driver. The above processing makes it possible to suppress this situation.

In yet another example, when, in response to a steering operation by a driver, the first steering angle sensor 14 generates an output and then with a certain lag time, the second steering angle sensor 19 generates an output (these outputs are generated in the same phase), the controller 8 may operate to derive the steering speed, according to only the output of the first steering angle sensor 14, without adding the output of the second steering angle sensor 19 responsive to the steering operation by the driver, to the output of the first steering angle sensor 14, i.e., without using the sum of the output of the first steering angle sensor 14 and the output of the second steering angle sensor 19. This makes it possible to suppress a situation where the functions/effects of the vehicle behavior control according to a steering operation of a driver become excessive.

In the case where the steering speed is derived based on the sum of the output of the first steering angle sensor 14 and the output of the second steering angle sensor 19, a magnitude of the steering speed itself tends to variously change. Thus, the steering speed derived from the sum is preferably normalized and then used.

Subsequently, in step S22, the controller 8 operates to determine whether or not the steering speed derived in the step S21 is greater than a given first threshold $T_{S1}$. As a result, when the steering speed is greater than the first threshold $T_{S1}$ (step S22: YES), the subroutine proceeds to step S23. In the step S23, the controller 8 operates to set a torque reduction flag indicative of whether or not a condition for allowing reduction of an output torque of the engine 4 so as to add a deceleration to the vehicle 1 is satisfied, to True (true value) indicative of a state in which the condition for allowing the torque reduction is satisfied.

Subsequently, in step S24, the controller 8 operates to obtain a target additional deceleration based on the steering speed. This target additional deceleration is a deceleration to be added to the vehicle 1 according to steering based on the steering apparatus 6, so as to accurately realize a vehicle behavior as intended by a driver.

Figure 6:
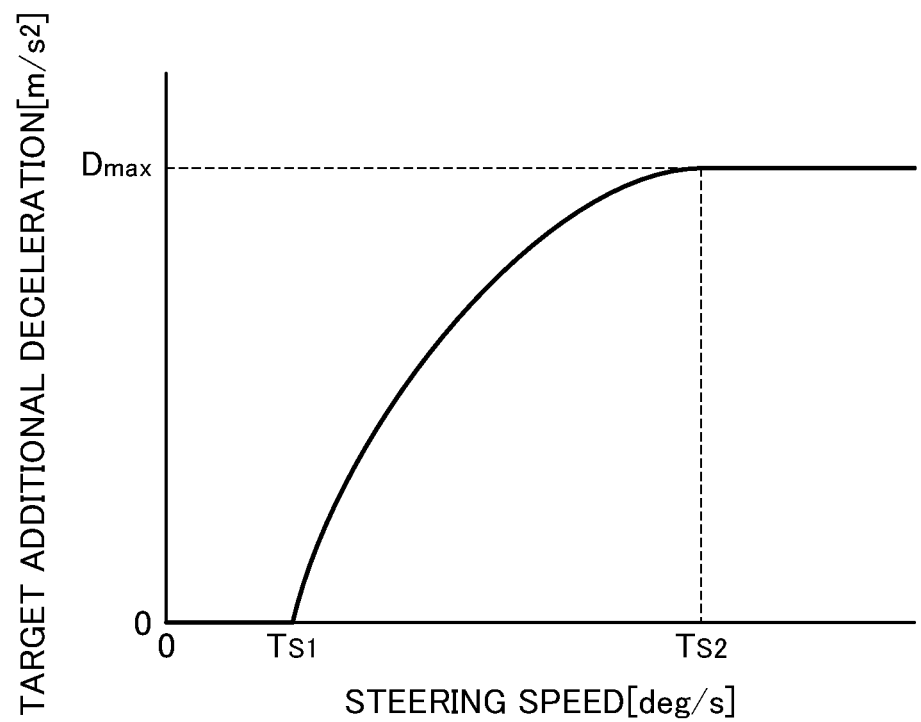
FIG. 6 is a map depicting a relationship between steering speed, and target additional deceleration to be decided by the vehicle behavior control device according to this embodiment.

Specifically, the controller 8 operates to obtain, in accordance with a relationship between target additional deceleration and steering speed, shown by the map in FIG. 6, a value of the target additional deceleration corresponding to the steering speed derived from the steering angle detected by one of the first steering angle sensor 14 and the second steering angle sensor 19.

In FIG. 6, the horizontal axis represents the steering speed, and the vertical axis represents the target additional deceleration. As depicted in FIG. 6, when the steering speed is equal to or less than the first threshold $T_{S1}$, a corresponding value of the target additional deceleration is 0. That is, when the steering speed is equal to or less than the first threshold $T_{S1}$, the control for adding a deceleration to the vehicle 1 (specifically, for reducing the output torque of the engine 4) according to steering based on the steering apparatus 6 is stopped.

On the other hand, when the steering speed is greater than the first threshold $T_{S1}$, a value of the target additional deceleration corresponding to this steering speed comes closer to a given upper limit value $D_{max}$ as the steering speed becomes larger. That is, as the steering speed becomes larger, the target additional deceleration becomes larger, and a rate of increase of the target additional deceleration becomes smaller. This upper limit value $D_{max}$ is set to a deceleration (e.g., 0.5 m/s$^2$≈0.05 G) to the extent that a driver does not feel intervention of the control even when the deceleration is added to the vehicle 1 according to steering based on the steering apparatus 6.

Further, when the steering speed is equal to or greater than a second threshold $T_{S2}$ greater than the first threshold $T_{S1}$, the target additional deceleration is maintained at the upper limit value $D_{max}$.

Subsequently, in step S25, the controller 8 operates to decide an additional deceleration in a current processing cycle (current-cycle additional deceleration), under a condition that a change rate of the additional deceleration is equal to or less than a threshold $R_{max}$ (e.g., 0.5 m/s$^3$).

Specifically, the controller 8 operates to, when a change rate from an additional deceleration decided in the last processing cycle (last-cycle additional deceleration) to the target additional deceleration obtained in the step S24 in the current processing cycle is equal to or less than the threshold $R_{max}$, decide the target additional deceleration obtained in the step S24, as the current-cycle additional deceleration.

On the other hand, the controller 8 operates to, when the change rate from the last-cycle additional deceleration to the target additional deceleration obtained in the step S24 in the current processing cycle is greater than the threshold $R_{max}$, decide, as the current-cycle additional deceleration, a value derived by increasing the last-cycle additional deceleration at the change rate $R_{max}$ for the given cycle period.

Subsequently, in step S26, the controller 8 operates to decide the torque reduction amount based on the current-cycle additional deceleration decided in the step S25. Specifically, the controller 8 operates to decide a value of the torque reduction amount necessary to realize the current-cycle additional deceleration, based on current vehicle speed, speed stage, road grade, etc., acquired in the step S1.

On the other hand, in the step S22, when the steering speed is not greater than the first threshold $T_{S1}$, i.e., equal to or greater than the first threshold $T_{S1}$ (step S22: NO), the subroutine proceeds to step S27. In the step S27, the controller 8 operates to set the torque reduction flag indicative of whether or not the condition for allowing reduction of the output torque of the engine 4 so as to add a deceleration to the vehicle 1 is satisfied, to False (false value) indicative of a state in which the condition for allowing the torque reduction is not satisfied.

After completion of the step S26 or S27, the controller 8 operates to terminate the torque reduction amount-deciding processing subroutine, and return to the main routine.

Returning to FIG. 4, after completion of the processings in the steps S2 and S3 and the torque reduction amount-deciding processing subroutine in the step S4, in step S5, the controller 8 (final target torque-deciding part 8c) operates to subtract the torque reduction amount decided by the torque reduction amount-deciding processing subroutine in the step S4, from the basic target torque decided in the step S3, to thereby decide the final target torque.

Subsequently, in step S6, the controller 8 (engine control part 8d) operates to control the engine 4 to cause the engine 4 to output the final target torque set in the step S5. Specifically, the controller 8 operates to, based on the final target torque set in the step S5 and an engine speed, decide various engine state amounts (e.g., air charge amount, fuel injection amount, intake-air temperature, and oxygen concentration) required for realizing the final target torque, and then, based on the decided state amounts, control a plurality of actuators for driving various components of the engine 4. In this case, the controller 8 operates to set a limit value or range with respect to each of the state amounts, and set a controlled variable of each actuator to enable its related state amount to preserve limitation by the limit value or range, so as to execute engine control. After completion of the step S6, the controller 8 operates to terminate the engine control processing routine.

<Functions/Effects>

Next, with reference to FIGS. 7 to 9, functions/effects of the vehicle behavior control device according to this embodiment will be described.

Figure 7:
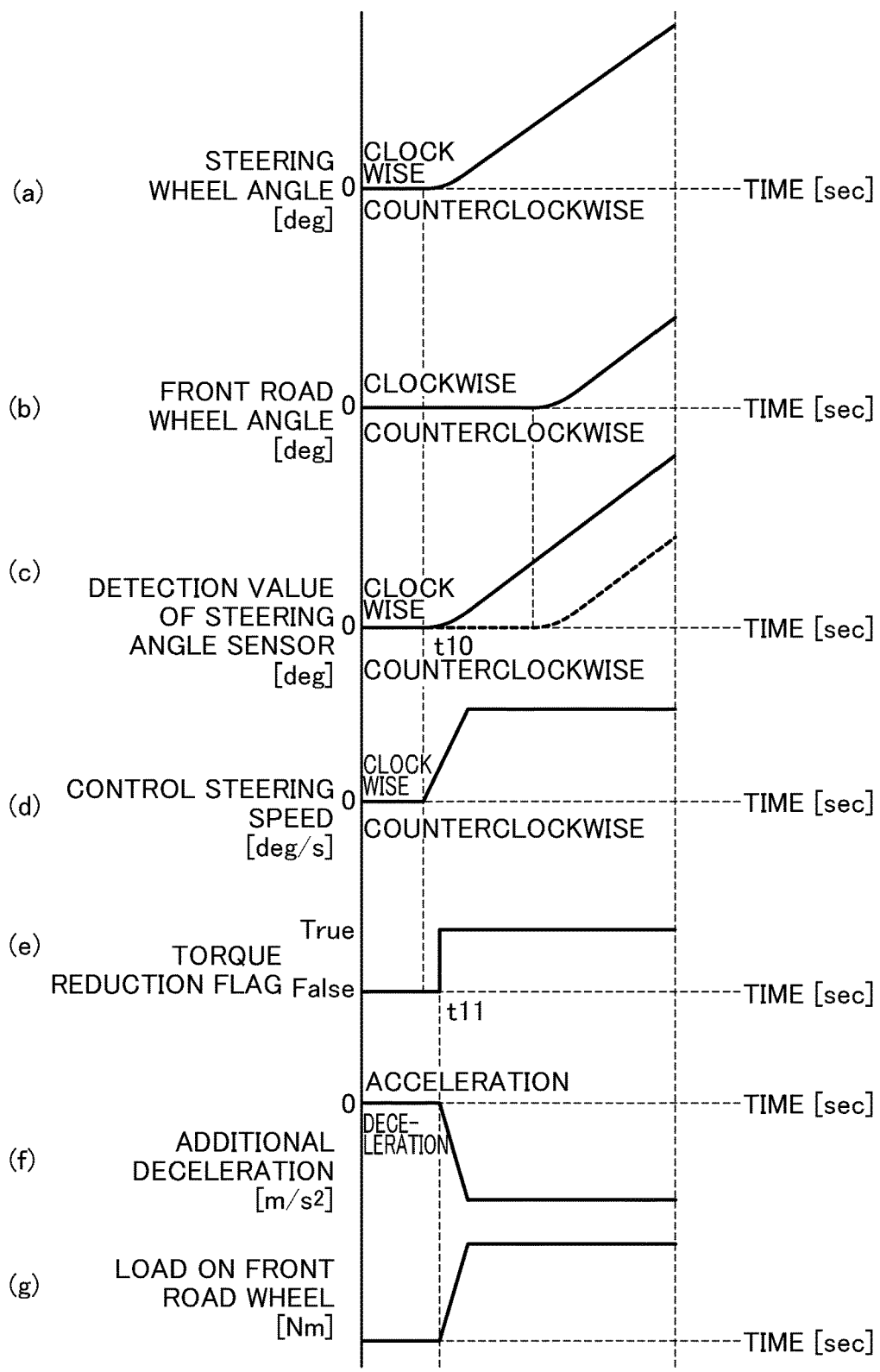
FIG. 7 shows time charts (a) to (g) presenting temporal changes of various parameters, occurring when a vehicle equipped with the vehicle behavior control device according to this embodiment is turning in a clockwise direction according to operation of a steering wheel.

FIG. 7 shows time charts (a) to (g) presenting temporal changes of various parameters, occurring when the vehicle 1 equipped with the vehicle behavior control device according to this embodiment is turning in a clockwise direction according to operation of the steering wheel 11. FIG. 7 is shown as an example where there is not any disturbance force arising from unevenness of a road surface, crosswind or the like.

The chart (a) is a chart presenting a change in actual steering angle of the steering wheel 11 (steering wheel angle), and the chart (b) is a chart presenting a change in actual turning angle of the front road wheels 2 (front road wheel angle). Further, the chart (c) is a chart presenting a change in detection value of each of the first steering angle sensor 14 and the second steering angle sensor 19. Specifically, in the chart (c), the solid line indicates a change in detection value of the first steering angle sensor 14, and the broken line indicates a change in detection value of the second steering angle sensor 19.

When a driver operates the steering wheel 11 to cause the vehicle 1 to turn in the clockwise direction, the actual steering wheel angle starts to increase from time t10 in the clockwise direction, as depicted in the chart (a), and, along with a change in the actual steering wheel angle, the detection value of the first steering angle sensor 14 provided in the steering wheel-side mechanism starts to promptly increase in the clockwise direction, as indicated by the solid line in the chart (c). Then, with a lag time with respect to start of the increase in the steering wheel angle, the actual front road wheel angle starts to increase in the clockwise direction, as depicted in the chart (b), and, along with a change in the actual front road wheel angle, the detection value of the second steering angle sensor 19 provided in the road wheel-side mechanism starts to increase, as indicated by the broken line in the chart (c).

The chart (d) is a chart presenting a change in steering speed (control steering speed) derived from the detection value of each of the first steering angle sensor 14 and the second steering angle sensor 19 in the chart (c).

As depicted in the chart (c), when a driver purposefully performs a steering operation, a detection value of the first steering angle sensor 14 provided in the steering wheel-side mechanism changes, and then with a certain lay time, a detection value of the second steering angle sensor 19 provided in the road wheel-side mechanism changes. In this process, the detection value of the first steering angle sensor 14 and the detection value of the second steering angle sensor 19 change in the same phase. In this situation, the controller 8 in this embodiment operates to derive the steering speed, according to only the output of the first steering angle sensor 14, without adding the output of the second steering angle sensor 19 to the output of the first steering angle sensor 14, i.e., without using the sum of the output of the first steering angle sensor 14 and the output of the second steering angle sensor 19. The control steering speed derived using the first steering angle sensor 14 provided in the steering wheel-side mechanism promptly rises from time t10 when the steering wheel angle starts to increase.

The chart (e) is a chart presenting the value (False or True) of the torque reduction flag set based on the control steering speed in the chart (d), in this embodiment.

In this embodiment, at time t11 shortly after the time t10 when the steering wheel angle starts to increase, the controller 8 operates to determine that the control steering speed becomes greater than the threshold $T_{S1}$ (step S22 in FIG. 5: YES). Further, at this time t11, the controller 8 operates to switch the torque reduction flag from False to True (step S23).

The chart (f) is a chart presenting a change in additional deceleration decided based on the control steering speed and the torque reduction flag, in this embodiment.

In this embodiment, the controller 8 operates to cause the additional deceleration to start to increase from the time t11 when the torque reduction flag is switched from False to True, and change the additional deceleration according to the control steering speed, under conditions that the additional deceleration is equal to or less than the upper limit value $D_{max}$ thereof (e.g., 0.5 m/s² ≈ 0.05 G), and a change rate thereof is equal to or less than the threshold $R_{max}$ (e.g., 0.5 m/s³) (steps S24 and S25). The controller 8 operates to decide a value of the torque reduction amount necessary to realize such an additional deceleration, based on various parameters such as current vehicle speed, speed stage and road grade (step S26), and subtract the torque reduction amount decided in this manner from the basic target torque to thereby decide the final target torque. In the case where the parameters such as current vehicle speed, speed stage and road grade are constant, the torque reduction amount changes in the same pattern as that of the additional deceleration depicted in the chart (f). Further, in the case where the basis target torque is constant, the final target torque changes in the same pattern as that of the additional deceleration depicted in the chart (f).

The chart (g) is a chart presenting a change in vertical load on the front road wheels 2, in this embodiment.

When the output torque of the engine 4 is reduced along with an increase in the additional deceleration as depicted in the chart (f), a deceleration is generated in the vehicle 1. Thus, according to this deceleration, load shift from a rear to a front of the vehicle 1 occurs, causing an increase in vertical load on the front road wheels 2 as depicted in the chart (g). In this case, the vertical load on the front road wheels 2 starts to increase from the time t11 shortly after the time t10 when the steering wheel angle starts to increase. As a result, a frictional force between each of the front road wheels 2 and a road surface is increased, and a cornering force of the front road wheels 2 is increased. This makes it possible to control a behavior of the vehicle 1 with good responsivity with respect to a steering operation by a driver.

As above, in this embodiment, the controller 8 is operable to reduce the output torque of the engine 4, based on a steering speed derived by taking into account both of the output of the first steering angle sensor 14 provided in the steering wheel-side mechanism and the output of the second steering angle sensor 19 provided in the road wheel-side mechanism. Particularly, in the situation where a driver purposefully performs a steering operation, as depicted in FIG. 7, the controller 8 is operable to reduce the output torque of the engine 4, based on a steering speed according to the output of the first steering angle sensor 14 provided in the steering wheel-side mechanism.

Thus, when a driver purposefully performs a steering operation (e.g., cornering or lane change), the output torque of the engine 4 can be quickly reduced, based on a steering speed according to a steering angle from the first steering angle sensor 14 capable of immediately detecting such a steering operation by a driver. This makes it possible to control a behavior of the vehicle 1 with good responsivity with respect to a steering operation by a driver to accurately realize the vehicle behavior as intended by the driver. More specifically, in this embodiment, it becomes possible to adequately realize induction of a diagonal attitude of the vehicle 1.

Figure 8:
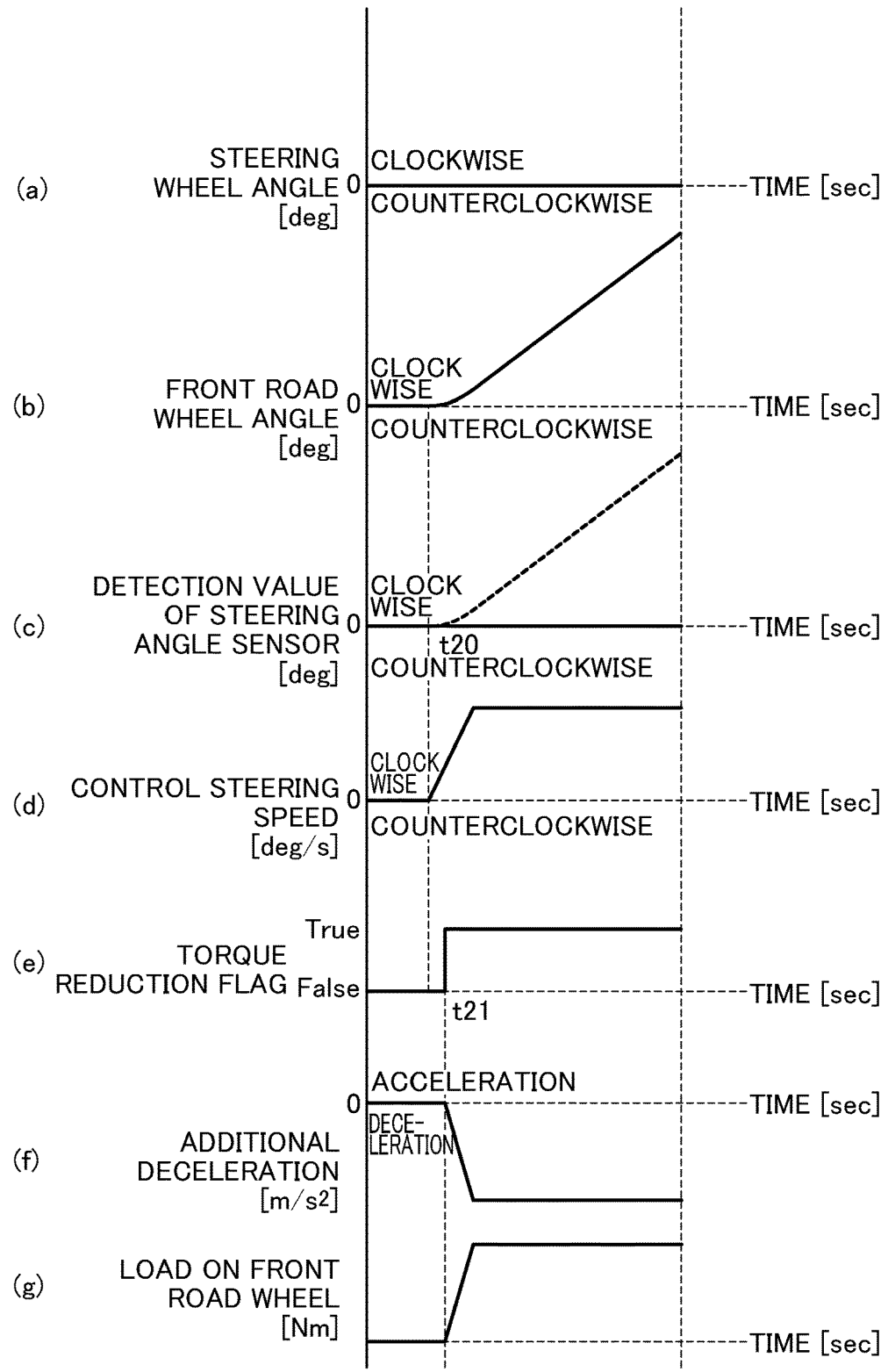
FIG. 8 shows time charts (a) to (g) presenting temporal changes of various parameters, occurring when a steering angle of a front road wheel of a vehicle equipped with the vehicle behavior control device according to this embodiment is changed by a disturbance force.

FIG. 8 shows time charts (a) to (g) presenting temporal changes of various parameters, occurring when a steering angle of the front road wheels 2 of the vehicle 1 equipped with the vehicle behavior control device according to this embodiment is changed by a disturbance force. FIG. 8 is shown as an example where, when the vehicle 1 travels straight ahead, the front road wheels 2 are forcibly turned in the clockwise direction under the influence of a disturbance force arising from unevenness of a road surface, crosswind or the like.

The chart (a) is a chart presenting a change in actual steering angle of the steering wheel 11 (steering wheel angle), and the chart (b) is a chart presenting a change in actual turning angle of the front road wheels 2 (front road wheel angle). Further, the chart (c) is a chart presenting a change in detection value of each of the first steering angle sensor 14 and the second steering angle sensor 19. Specifically, in the chart (c), the solid line indicates a change in detection value of the first steering angle sensor 14, and the broken line indicates a change in detection value of the second steering angle sensor 19.

When the front road wheels 2 are forcibly turned in the clockwise direction by the disturbance force, the actual front road wheel angle starts to increase in the clockwise direction from time t20, as depicted in the chart (b), and, along with a change in the actual front road wheel angle, the detection value of the second steering angle sensor 19 provided in the road wheel-side mechanism promptly starts to increase, as indicated by the broken line in the chart (c). In this case, i.e., when the front road wheels 2 are forcibly turned in the clockwise direction by the disturbance force, without any operation of the steering wheel 11 by a driver, the actual steering wheel angle does not promptly change, as depicted in the chart (a), and thus the detection value of the first steering angle sensor 14 provided in the steering wheel-side mechanism also does not promptly change, as depicted in the chart (c). In one example, the above steering apparatus 6 can be configured to control the electric motor 13 such that turning of the front road wheels 2 due to a disturbance force is transmitted to the steering wheel 11 to thereby steer the steering wheel 11. In this case, each of the actual steering wheel angle and the detection value of the first steering angle sensor 14 provided in the steering wheel-side mechanism changes with a lag time with respect to the change in the actual front road wheel angle.

The chart (d) is a chart presenting a change in steering speed (control steering speed) derived from the detection value of each of the first steering angle sensor 14 and the second steering angle sensor 19 in the chart (c).

As depicted in the chart (c), when the front road wheels 2 are turned by a disturbance force in a situation where the vehicle 1 travels straight ahead, only the detection value of the second steering angle sensor 19 provided in the steering road-side mechanism, almost without any change in the detection value of the first steering angle sensor 14 provided in the steering wheel-side mechanism, so that the sum of the output of the first steering angle sensor 14 and the output of the second steering angle sensor 19 is almost coincident with the output of the second steering angle sensor 19. Thus, the controller 8 operates to derive a steering speed according to the output of the second steering angle sensor 19. The control steering speed derived using the second steering angle sensor 19 provided in the road wheel-side mechanism quickly rises from the time t20 when the front road wheel angle starts to increase, as depicted in the chart (d).

The chart (e) is a chart presenting the value (False or True) of the torque reduction flag set based on the control steering speed in the chart (d), in this embodiment.

In this embodiment, at time t21 shortly after the time t20 when the front road wheel angle starts to increase, the controller 8 operates to determine that the control steering speed becomes greater than the threshold $T_{S1}$ (step S22 in FIG. 5: YES). Further, at this time t21, the controller 8 operates to switch the torque reduction flag from False to True (step S23).

The chart (f) is a chart presenting a change in additional deceleration decided based on the control steering speed and the torque reduction flag, in this embodiment.

In this embodiment, the controller 8 operates to cause the additional deceleration to start to increase from the time t21 when the torque reduction flag is switched from False to True, and change the additional deceleration according to the control steering speed, under conditions that the additional deceleration is equal to or less than the upper limit value $D_{max}$ thereof (e.g., 0.5 m/s²≈0.05 G), and a change rate thereof is equal to or less than the threshold $R_{max}$ (e.g., 0.5 m/s³) (steps S24 and S25). The controller 8 operates to decide a value of the torque reduction amount necessary to realize such an additional deceleration, based on various parameters such as current vehicle speed, speed stage and road grade (step S26), and subtract the torque reduction amount decided in this manner from the basic target torque to thereby decide the final target torque. In the case where the parameters such as current vehicle speed, speed stage and road grade are constant, the torque reduction amount changes in the same pattern as that of the additional deceleration depicted in the chart (f). Further, in the case where the basis target torque is constant, the final target torque changes in the same pattern as that of the additional deceleration depicted in the chart (f).

The chart (g) is a chart presenting a change in vertical load on the front road wheels 2, in this embodiment.

When the output torque of the engine 4 is reduced along with an increase in the additional deceleration as depicted in the chart (f), a deceleration is generated in the vehicle 1. Thus, according to this deceleration, load shift from the rear to the front of the vehicle 1 occurs, causing an increase in vertical load on the front road wheels 2 as depicted in the chart (g). In this case, the vertical load on the front road wheels 2 starts to increase from the time t21 shortly after the time t20 when the steering wheel angle starts to increase.

In a linear region of a tire curve where a slip angle of the front road wheels 2 is relatively small, a lateral force generated in the front road wheels 2 is approximately proportional to the slip angle, so that the lateral force increases along with an increase in the front road wheel angle. When the vertical load on the front road wheels 2 is increased as in this embodiment (see the chart (g)) in the situation where the lateral force increases along with the change in the front road wheel angle, a frictional force in contact regions of the front road wheels 2 increases, thereby leading to a further increase in the lateral force generated in the contact regions of the front road wheels 2.

Further, in the linear region of the tire curve where the slip angle of the front road wheels 2 is relatively small, a magnitude of torque acting to return the turned front road wheels 2 to their neutral positions enabling straight-ahead traveling (self-aligning torque) is basically proportional to the lateral force generated in the front road wheels 2. That is, in principle, when the steering angle in the front road wheels 2 increases, the torque acting to return the turned front road wheels 2 to the neutral positions enabling straight-ahead traveling increases along with an increase in the lateral force. In this situation, in this embodiment, from the time t21 which is almost the same as the time when the front road wheel angle starts to increase, the vertical load on the front road wheels 2 is increased together with the lateral force, so that the torque acting to return the turned front road wheels 2 to the neutral positions enabling straight-ahead traveling is also largely increased from the time t 21 which is almost the same as the time when the front road wheel angle starts to increase. This makes it possible to suppress a lateral displacement of a course of the vehicle 1 due to a disturbance force, to improve stability of straight-ahead traveling performance of the vehicle 1.

As above, in this embodiment, the controller 8 is operable to reduce the output torque of the engine 4, based on a steering speed derived by taking into account both of the output of the first steering angle sensor 14 provided in the steering wheel-side mechanism and the output of the second steering angle sensor 19 provided in the road wheel-side mechanism. Particularly, when the front road wheels 2 are turned by a disturbance force in a situation where a driver does not purposefully perform a steering operation, as depicted in FIG. 8, the controller 8 is operable to reduce the output torque of the engine 4, based on a steering speed according to the output of the second steering angle sensor 14 provided in the road wheel-side mechanism.

Thus, when the front road wheels 2 are forcibly turned under the influence of a disturbance force arising from unevenness of a road surface, crosswind or the like, the output torque of the engine 4 can be quickly reduced, based on a steering speed according to a steering angle from the first steering angle sensor 14 capable of immediately detecting such turning of the front road wheels 2. This makes it possible to generate the torque acting to return the steering angle of the front road wheels 2 to a neutral angle enabling straight-ahead traveling (self-aligning torque), at a timing before the disturbance force is transmitted to a driver via the steering wheel 11, to improve stability of straight-ahead traveling performance of the vehicle 1.

Further, in a situation where the driver feels, via the steering wheel 11, tuning of the front road wheels 2 caused by a disturbance force, and then attempts to perform a corrective steering operation for maintaining a course of the vehicle 1, it becomes possible to, before the driver starts the corrective steering operation, reduce the output torque of the engine 2 to increase a vertical load on the front road wheels 2, so that a lateral force to be generated in the front road wheels 2 when the driver starts the corrective steering operation can be further increased. Thus, it becomes possible to enhance responsivity of a behavior of the vehicle 1 with respect to the corrective steering operation. This makes it possible to suppress an unnecessary corrective steering operation to improve stability of vehicle attitude and riding comfort. These functions/effects of this embodiment are effective in traveling, particularly, on an irregular ground from which instantaneous spikes of reaction force arise.

Figure 9:
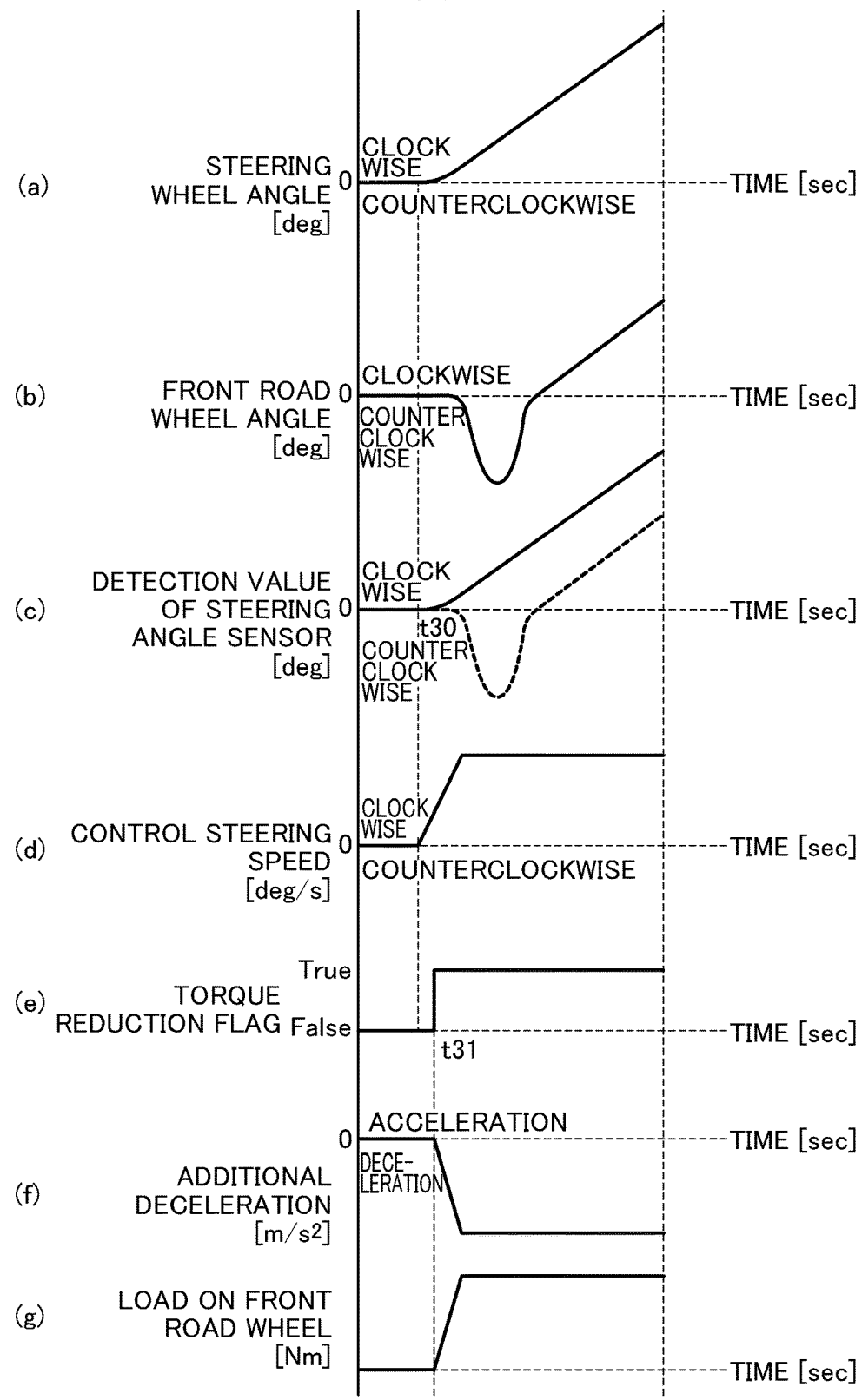
FIG. 9 shows time charts (a) to (g) presenting temporal changes of various parameters, occurring when a steering angle of a front road wheel of a vehicle equipped with the vehicle behavior control device according to this embodiment is changed by a disturbance force, during turning of the vehicle in the clockwise direction according to operation of the steering wheel.

FIG. 9 shows time charts (a) to (g) presenting temporal changes of various parameters, occurring when a steering angle of the front road wheels 2 of the vehicle 1 equipped with the vehicle behavior control device according to this embodiment is changed by a disturbance force, during turning of the vehicle 1 in the clockwise direction according to operation of the steering wheel 11. FIG. 9 is shown as an example where the front road wheels 2 are forcibly turned in a counterclockwise direction (i.e., in a direction opposite to a vehicle turning direction) under the influence of a disturbance force arising from unevenness of a road surface, crosswind or the like.

The chart (a) is a chart presenting a change in actual steering angle of the steering wheel 11 (steering wheel angle), and the chart (b) is a chart presenting a change in actual turning angle of the front road wheels 2 (front road wheel angle). Further, the chart (c) is a chart presenting a change in detection value of each of the first steering angle sensor 14 and the second steering angle sensor 19. Specifically, in the chart (c), the solid line indicates a change in detection value of the first steering angle sensor 14, and the broken line indicates a change in detection value of the second steering angle sensor 19.

When a driver operates the steering wheel 11 to cause the vehicle 1 to turn in the clockwise direction, the actual steering wheel angle starts to increase from time t30 in the clockwise direction, as depicted in the chart (a), and, along with a change in the actual steering wheel angle, the detection value of the first steering angle sensor 14 provided in the steering wheel-side mechanism starts to promptly increase in the clockwise direction, as indicated by the solid line in the chart (c)

Then, when the front road wheels 2 are forcibly turned in the counterclockwise direction by the disturbance force shortly after start of the increase in the steering wheel angle, the actual front road wheel angle momentarily increases in the counterclockwise direction, as depicted in the chart (b). Subsequently, along with an increase in the steering wheel angle, the actual front road wheel angle starts to increase in the clockwise direction. According to a change in the actual front road wheel angle, the detection value of the second steering angle sensor 19 provided in the road wheel-side mechanism changes as indicated by the broken line in the chart (c).

The chart (d) is a chart presenting a change in steering speed (control steering speed) derived from the detection value of each of the first steering angle sensor 14 and the second steering angle sensor 19 in the chart (c).

As depicted in the chart (c), when, during a steering operation by a driver, the front road wheels 2 are turned in a direction opposite to a direction of the steering operation by the driver, due to the disturbance force, the detection value of the second steering angle sensor 19 changes in an opposite phase with respect to a change in the detection value of the first steering angle sensor 14. In this situation, the controller 8 in this embodiment operates to derive the steering speed, according to only the output of the first steering angle sensor 14, without adding the output of the second steering angle sensor 19 to the output of the first steering angle sensor 14, i.e., without using the sum of the output of the first steering angle sensor 14 and the output of the second steering angle sensor 19. Although, after a short period of time, the detection value of the second steering angle sensor 19 starts to change in the same phase with respect to the change in the detection value of the first steering angle sensor 14, the controller 8 operates to derive the steering speed, according to only the output of the first steering angle sensor 14, without adding the output of the second steering angle sensor 19 to the output of the first steering angle sensor 14, so as to suppress the situation where the functions/effects of the vehicle behavior control according to a steering operation of a driver become excessive.

The control steering speed derived using the first steering angle sensor 14 provided in the steering wheel-side mechanism quickly rises from the time t30 when the steering wheel angle starts to increase, as depicted in the chart (d), and is subsequently maintained approximately constant.

The chart (e) is a chart presenting the value (False or True) of the torque reduction flag set based on the control steering speed in the chart (d), in this embodiment.

In this embodiment, at time t31 shortly after the time t30 when the front road wheel angle starts to increase, the controller 8 operates to determine that the control steering speed becomes greater than the threshold $T_{S1}$ (step S22 in FIG. 5: YES). Further, at this time t31, the controller 8 operates to switch the torque reduction flag from False to True (step S23).

The chart (f) is a chart presenting a change in additional deceleration decided based on the control steering speed and the torque reduction flag, in this embodiment.

In this embodiment, the controller 8 operates to cause the additional deceleration to start to increase from the time t31 when the torque reduction flag is switched from False to True, and change the additional deceleration according to the control steering speed, under conditions that the additional deceleration is equal to or less than the upper limit value $D_{max}$ thereof (e.g., 0.5 m/s² ≈ 0.05 G), and a change rate thereof is equal to or less than the threshold $R_{max}$ (e.g., 0.5 m/s³) (steps S24 and S25). The controller 8 operates to decide a value of the torque reduction amount necessary to realize such an additional deceleration, based on various parameters such as current vehicle speed, speed stage and road grade (step S26), and subtract the torque reduction amount decided in this manner from the basic target torque to thereby decide the final target torque. In the case where the parameters such as current vehicle speed, speed stage and road grade are constant, the torque reduction amount changes in the same pattern as that of the additional deceleration depicted in the chart (f). Further, in the case where the basis target torque is constant, the final target torque changes in the same pattern as that of the additional deceleration depicted in the chart (f).

The chart (g) is a chart presenting a change in vertical load on the front road wheels 2, in this embodiment.

When the output torque of the engine 4 is reduced along with an increase in the additional deceleration as depicted in the chart (f), a deceleration is generated in the vehicle 1. Thus, according to this deceleration, load shift from the rear to the front of the vehicle 1 occurs, causing an increase in vertical load on the front road wheels 2 as depicted in the chart (g). In this case, the vertical load on the front road wheels 2 starts to increase from the time t31 shortly after the time t30 when the steering wheel angle starts to increase. As a result, a frictional force between each of the front road wheels 2 and a road surface is increased, and a cornering force of the front road wheels 2 is increased. This makes it possible to control a behavior of the vehicle 1 with good responsivity with respect to a steering operation by a driver.

In this embodiment, even when, during a steering operation by a driver, the front road wheels 2 are turned in a direction opposite to a direction of the steering operation, due to a disturbance force, the output torque of the engine 4 is reduced based on a steering speed according to a steering angle from the first steering angle sensor 14 provided in the steering wheel-side mechanism, without using the second steering angle sensor 19 provided in the road wheel-side mechanism, so that it becomes possible to adequately ensure the vehicle behavior control according to a steering operation by a driver. Thus, for example, even when the front road wheels 2 are turned due to rough road during steady turning of the vehicle, it becomes possible to stable perform steering retention of the steering shaft 11.

<Modifications>

Figure 10:
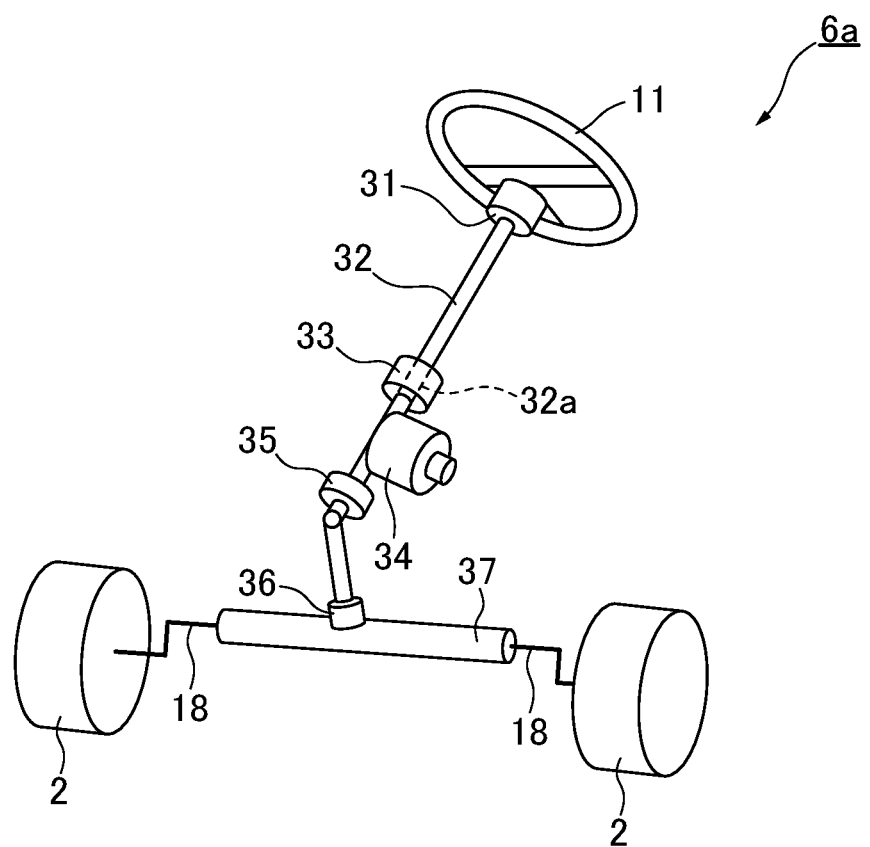
FIG. 10 is a schematic perspective view depicting a steering apparatus in one modification of the above embodiment.

Although the above embodiment has been described based on an example where the present invention is applied to a vehicle equipped with a steer-by-wire type steering apparatus 6, the present invention is also applicable to a vehicle equipped with any type of steering apparatus other than the steer-by-wire type steering apparatus. For example, the present invention is applicable to a vehicle equipped with a steering apparatus of a type depicted in FIG. 10. FIG. 10 is a schematic perspective view depicting a steering apparatus in one modification of the above embodiment.

As depicted in FIG. 10, the steering apparatus 6a in the modified embodiment is configured as an electric power assisted steering (EPAS) in which an electric motor 32 is used to assist steering of the steering wheel 11. This steering apparatus 6a is configured such that a mechanism for transmitting rotation of the steering wheel 11 (steering wheel-side mechanism) and a mechanism for turning front road wheels according to the rotation of the steering wheel 11 (road wheel-side mechanism) are coupled together through a torsion bar (low rigidity portion) 32a having relatively low torsional rigidity about a rotational axis thereof.

Specifically, as the steering wheel-side mechanism, the steering apparatus 6a comprises: the steering wheel 11 to be operated by a driver; a steering shaft 32 rotatable together with the steering wheel 11; a first steering angle sensor 31 provided on an upper end region of the steering shaft 32 and configured to detect a rotational angle (steering angle) in the upper end region of the steering shaft 32; and a torque sensor 33 configured to detect a steering torque given by the driver via the steering wheel 11, based on an amount of torsion of the torsion bar 32a. Further, as the road wheel-side mechanism coupled to the steering wheel-side mechanism through the torsion bar 32a (a portion of the steering shaft 32 whose torsional rigidity about a rotational axis thereof is less than that of the remaining portion thereof), the steering apparatus 6a comprises: an electric motor 34 for giving an assist torque to the steering shaft 32 via a non-depicted speed reduction mechanism; a pinion gear 36 provided at a lower end of the steering shaft 32 and configured to be rotated according to rotation of the steering shaft 32; a rack shaft 37 movable according to the rotation of the pinion gear 36; a pair of tie rods 18 for turning the respective front road wheels 2 according to the movement of the rack shaft 36; and a second steering angle sensor 35 provided on a lower end region of the steering shaft 32 and configured to detect a rotational angle (steering angle) in the lower end region of the steering shaft 32.

In a vehicle 1 equipped with the above steering apparatus 6a, the controller 8 in the modified embodiment is operable to reduce the output torque of the engine 4, based on a steering speed according to a sum of an output of the first steering angle sensor 31 provided upstream of the torsion bar 32a as a low rigidity portion (i.e., provided in the steering wheel-side mechanism) and an output of the second steering angle sensor 35 provided downstream of the torsion bar 32a (i.e., provided in the road wheel-side mechanism).

Particularly, in the situation where a driver purposefully performs a steering operation, the controller 8 is operable to reduce the output torque of the engine 4, based on a steering speed according to the output of the first steering angle sensor 31 provided in the steering wheel-side mechanism. Thus, when a driver purposefully performs a steering operation (e.g., cornering or lane change), the output torque of the engine 4 can be quickly reduced, based on a steering speed according to a steering angle from the first steering angle sensor 14 capable of immediately detecting such a steering operation by a driver. This makes it possible to control a behavior of the vehicle 1 with good responsivity with respect to a steering operation by a driver to accurately realize the vehicle behavior as intended by the driver. More specifically, it becomes possible to adequately realize induction of a diagonal attitude of the vehicle 1.

On the other hand, when the front road wheels 2 are turned by a disturbance force in a situation where a driver does not purposefully perform a steering operation, the controller 8 is operable to reduce the output torque of the engine 4, based on a steering speed according to the output of the second steering angle sensor 14 provided in the road wheel-side mechanism. Thus, when the front road wheels 2 are forcibly turned under the influence of a disturbance force arising from unevenness of a road surface, crosswind or the like, the output torque of the engine 4 can be quickly reduced, based on a steering speed according to a steering angle from the first steering angle sensor 14 capable of immediately detecting such turning of the front road wheels 2. This makes it possible to generate the torque acting to return the steering angle of the front road wheels 2 to a neutral angle enabling straight-ahead traveling (self-aligning torque), at a timing before the disturbance force is transmitted to a driver via the steering wheel 11, to improve stability of straight-ahead traveling performance of the vehicle 1.

Further, in a situation where the driver feels, via the steering wheel 11, tuning of the front road wheels 2 caused by a disturbance force, and then attempts to perform a corrective steering operation for maintaining a course of the vehicle 1, it becomes possible to, before the driver starts the corrective steering operation, reduce the output torque of the engine 2 to increase a vertical load on the front road wheels 2, so that a lateral force to be generated in the front road wheels 2 when the driver starts the corrective steering operation can be further increased. Thus, it becomes possible to enhance responsivity of a behavior of the vehicle 1 with respect to the corrective steering operation. This makes it possible to suppress an unnecessary corrective steering operation to improve stability of vehicle attitude and riding comfort.

Although the above embodiment has been described based on an example where the vehicle 1 equipped with the vehicle behavior control device mounts an engine 4 for driving drive road wheels, the vehicle behavior control device of the present invention is also applicable to a vehicle which mounts a motor for driving drive road wheels by electricity supplied from a battery or capacitor. In this case, the controller 8 is configured to perform control of reducing an output torque of the motor according to a steering speed.

The invention claimed is:

1. A vehicle behavior control device configured to control a behavior of a vehicle having steerable front road wheels, comprising:
 a steering apparatus configured to transmit rotation of a steering wheel toward the front road wheels, the steering apparatus having: a steering wheel-side mechanism which is coupled to the steering wheel and configured to transmit rotation of the steering wheel; and a road wheel-side mechanism which is coupled to the steering wheel-side mechanism via a low rigidity portion having a relatively low torsional rigidity or is mechanically separated from the steering wheel-side mechanism, and configured to turn the front road wheels according to the rotation of the steering wheel; and
 a controller configured to, when a steering speed in the steering apparatus becomes greater than a given threshold greater than 0, perform a driving force reduction control in order to reduce a vehicle driving force according to the steering speed,
 wherein the steering apparatus comprises: a first steering angle sensor provided in the steering wheel-side mechanism and configured to detect a steering angle corresponding to rotation of the steering wheel; and a second steering angle sensor provided in the road wheel-side mechanism and configured to detect a steering angle corresponding to turning of the front road wheels,
 wherein the controller is configured to calculate the steering speed from an output of the first steering angle sensor and an output of the second steering angle sensor in order to perform the driving force reduction control based on the steering speed, and
 wherein the controller is configured to perform a determination whether a steering generated in the vehicle corresponds to a steering operation purposefully performed by a driver or a turning of the front road wheels by a disturbance force, based on the output of the first steering angle sensor and the output of the second steering angle sensor, and is configured to change a method for calculating the steering speed in accordance with a result of the determination.

2. The vehicle behavior control device as recited in claim 1,
 wherein the controller is configured to calculate the steering speed by performing weighted addition of the output of the first steering angle sensor and the output of the second steering angle sensor, and to perform the determination whether the steering generated in the vehicle corresponds to the steering operation or the turning of the front road wheels by the disturbance force based on a frequency of phase-change of the steering speed in the steering apparatus, in order to change a weighting factor for the weighted addition.

3. The vehicle behavior control device as recited in claim 1,
 wherein, when the output of the first steering angle sensor indicates that operation of rotating the steering wheel is performed, and the output of the second steering angle sensor indicates that the front road wheels are turned in a direction opposite to a direction of the rotation of the steering wheel, the controller is configured to perform the driving force reduction control based on the steering speed in accordance with only the output of the first steering angle sensor.

4. The vehicle behavior control device as recited in claim 1,
 wherein the controller is configured to reduce the driving force by a larger amount as the steering speed becomes larger, to an extent that a deceleration caused in the vehicle by the reduction in the driving force becomes equal to or less than 0.05 G.

* * * * *